United States Patent [19]
Pontius

[11] Patent Number: 6,110,564
[45] Date of Patent: Aug. 29, 2000

[54] EVAPORATIVE HUMIDIFIER PAD

[75] Inventor: Jeffrey S. Pontius, Amanda, Ohio

[73] Assignee: Columbus Industries, Inc., Ashville, Ohio

[21] Appl. No.: 09/204,827

[22] Filed: Dec. 3, 1998

[51] Int. Cl.[7] .............................. B32B 3/10; B01D 47/00
[52] U.S. Cl. ..................... 428/137; 428/154; 428/155; 261/106; 261/107
[58] Field of Search ..................................... 428/155, 154, 428/136, 137, 118; 261/106, 107, DIG. 41

[56] References Cited

U.S. PATENT DOCUMENTS

| | | |
|---|---|---|
| 2,637,540 | 5/1953 | Rowe . |
| 2,955,064 | 10/1960 | Frohmader ............................. 428/136 |
| 5,374,381 | 12/1994 | Schuld . |

Primary Examiner—Donald Loney
Attorney, Agent, or Firm—Francis T. Kremblas, Jr.

[57] ABSTRACT

A humidifier pad with multiple layers of slit and expanded paper laminated together. At least one, and in some preferred embodiments, up to half of the paper layers comprise substantially nonwicking paper and the remaining layers comprise highly absorbent wicking paper. Wick type humidifier pads are particularly useful in humidifiers wherein the lower portion of the pad is submerged in a reservoir of water. The upper portion of the pad, exposed to a flow of air to be humidified, is supplied with water due to the high rate of capillary rise featured by the wicking paper layers. Including non-wicking layers wetted by the wicking layers provide an output capacity comparable to conventionally constructed pads which include all wicking paper layers and an attendant saving of the cost of materials.

4 Claims, 2 Drawing Sheets

| PAPER RATIO | 24w | 20w/4n | 17w/7n | 12w/12n | 6w/18n | 24n | NO PAPER |
|---|---|---|---|---|---|---|---|
| OUTPUT | 2.99 | 2.9 | 2.83 | 2.46 | 1.7 | 0.31 | 0.25 |
FIG-2
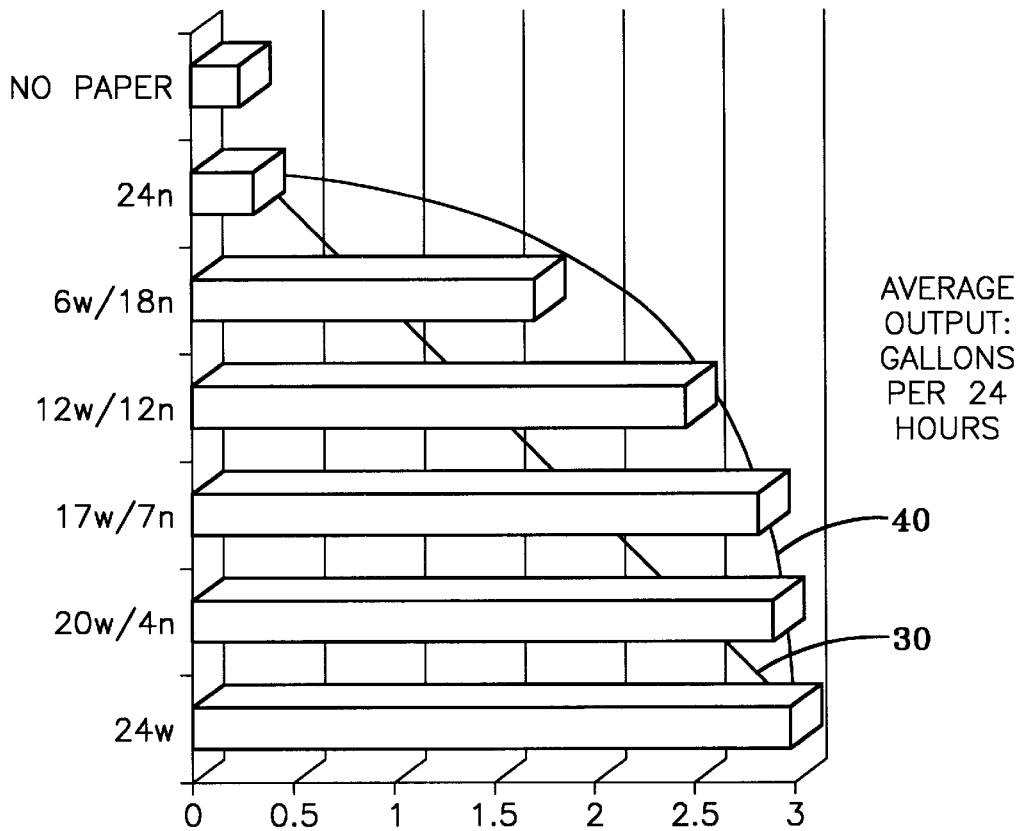
FIG-3
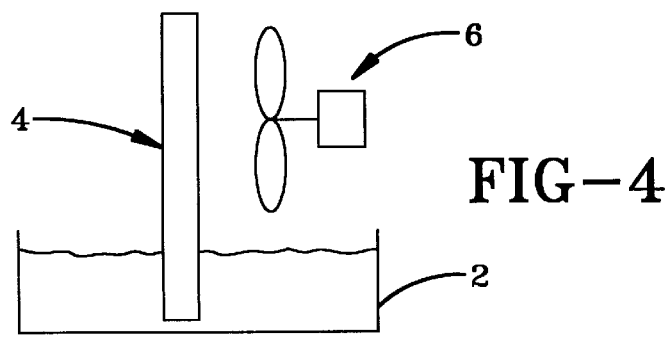
FIG-4

EVAPORATIVE HUMIDIFIER PAD

BACKGROUND OF THE INVENTION

1. Field Of The Invention

This invention relates generally to evaporative humidifiers, and specifically to humidifier pads used in evaporative humidifiers.

2. Description Of The Related Art

Evaporative humidifiers humidify air which is passed through paths formed in a wetted humidifier pad element. A flow of air is directed into the wetted pad to cause evaporation of the water absorbed by the pad. The evaporated water is carried off in the air passing through the pad element.

One form of humidifier pad commonly used currently is made of a plurality of superposed sheets or layers of perforated material, preferably adhesively bonded together. Typically, one form comprises sheets of absorbent paper. Another form comprises coated aluminum. The perforations can be conveniently provided by a conventional "slitting and expanding" process well-known in the trade. This process creates a plurality of generally diamond shaped openings.

The slit and expanded humidifier pads comprising layers of coated aluminum are advantageous for their strength and stability. However, the aluminum layers must be coated with an absorbent coating and are useful only in humidifiers which feed water to the pad from the top. The disadvantages of these all-metal pads is the high cost of aluminum and the associated coating process.

Evaporative pads comprising slit and expanded paper layers, with or without an outer frame or a supporting layer of slit and expanded aluminum, are significantly lower in cost than the all aluminum type pads. While all-paper pads do not have the same useful life span as the all aluminum pads, their useful life relative to cost has made them a practical and economic choice in many applications. Therefore, the evaporative pads comprising absorbent paper layers represent a highly successful market, particularly in the residential room humidifier units.

Water must be continuously supplied to the pad for evaporation to occur at a consistent, predictable rate. Water must be transported to the areas of the humidifier pad from which the water is evaporated: the regions surrounding the openings in the tortuous airflow paths through the layers. In the case of the paper type pads, this occurs in one of two ways. In a wicking humidifier system, which has a reservoir in which the lower portion of an absorbent, paper pad is disposed, water is absorbed and wicks up by capillary action through the fibrous matrix of the paper layers to moisten the entire pad. Alternatively, in a downflow humidifier system, water flows downwardly from the top of the humidifier pad, and both gravity and capillary action transport the replacement water uniformly throughout the pad. In both systems, water is present at, and resupplied to, the paper media surrounding the openings in the layers of the pad so that impinging air can entrain and carry off the water vapor evaporated from the pad.

As is well known and conventional in the art, wicking up type humidifiers are preferred for portable, residential room type humidifier units because no piping connection to an external water supply is necessary. An example of a wick-up humidifier is shown schematically in FIG. 4. This type of unit relies upon a reservoir 2 of water which must be replenished from time to time and an evaporative wicking pad element 4 having its lower portion submerged in the water reservoir 2. A larger upper portion of pad element 4 is exposed to a flow of air driven by a fan 6. Typically, such units are designed for a given output capacity measured by the volume of water per unit time. Units having different output capacities are made to offer the user with appropriate choices relative to the particular output needed for a given application.

The output capacity of a given unit depends upon several parameters, including the temperature and humidity level of the incoming air, the rate of air flow delivered to the evaporative pad, and the size, composition and effective surface area of the evaporative pad.

The width of the pad is limited by size and cost limitations in designing such residential room-sized units. In addition, there is a proportional increase in the size of the motor and fan unit necessary to supply the necessary flow of air to aid evaporation and carry off the water vapor.

Since the supply of water to the exposed portion of the pad is derived via capillary action from the lower portion of the pad submerged in the reservoir, it has been found that 7 or 8 inches above the water level, the rate of evaporation under typical use conditions is sufficiently greater than the rate water can be effectively transported to these upper portions of the pad. Therefore, it becomes impractical to increase output capacity by merely increasing the height of the pad exposed above the water level beyond about 10 inches or so for the typical portable residential room humidifier.

As noted earlier herein, these wick-up type humidifier pads rely upon capillary action to provide a continuous supply of water to maintain the area of the portion of the pad exposed to the air flow in a wetted condition. Therefore, the conventional pad for this type of unit employs only layers or sheets of highly absorbent paper having a high rate of capillary rise. The output capacity is then varied by the dimensions of the pad, including its thickness. In portable residential room type humidifiers, capacity is primarily varied by the numbers of layers of wicking paper in the pad.

Although the practical height and width of pads are limited as noted above, the thickness of a pad can vary substantially. Room size humidifier units, using the highly absorbent wicking paper layers have successfully provided a very sufficient range of capacity using relatively small dimensioned humidifier pads varying in thickness from about 1 to 3 inches using a range of about 7 to 28 layers of wicking paper. The majority of such units usually employ 14 or more layers of wicking paper.

Generally speaking, suitable highly absorbent papers which have high rates of capillary rise and sufficient strength necessary to withstand the slitting and expanding process are significantly more expensive than other forms of Kraft paper having relatively low capillary rise properties.

In view of the highly competitive nature of the relevant market, there is always a need to reduce the cost of this type of humidifier pad without significant sacrifice of the necessary functional features, including the capacity or level of output of any given design for a humidifier unit.

SUMMARY OF THE INVENTION

The present invention comprises a humidifier pad including a plurality of superposed sheets of slit and expanded wicking paper adhesively bonded together to form a composite element or pad. Wicking paper as used herein means a type of highly absorbent paper which features a high capillary rise value suitable for use in a wicking up type humidifier unit. Each sheet of wicking paper has opposing broad or major surfaces. The invention further comprises a first sheet of slit and expanded paper having relatively low capillary rise properties and opposing broad or major surfaces. This low capillary rise sheet is referred to herein as substantially nonwicking paper.

In a preferred embodiment, the first sheet of nonwicking paper is interposed between, and preferably bonded to, adjacent facing major surfaces of a first pair of said wicking paper sheets. In a more preferred embodiment, the invention comprises a plurality of sheets of nonwicking paper, and each of said sheets of nonwicking paper is interposed between, and laminated to, a corresponding pair of wicking paper sheets.

Distinct, unexpected advantages arise from the invention, including obtaining output capacity levels from a humidifier pad which includes one or more of the lower cost, nonwicking paper layers with the layers of wicking paper which possess substantially equivalent output capacities on a practical basis compared to a pad comprising the same total number of layers of wicking paper. This unexpected level of capacity output remains significant for pads which include up to half of the wicking paper layers replaced by nonwicking paper layers, but decreases substantially for pads which include more layers of nonwicking paper than layers of wicking paper.

BRIEF DESCRIPTION OF THE DRAWINGS

FIG. 2 is a table containing experimental data of the evaporation rate for each filter tested;

FIG. 3 is a graph of output rates versus the ratio of wicking paper sheets to nonwicking paper sheets; and FIG. 4 is a schematic view of a conventional wicking-up type humidifier.

Figure 1:
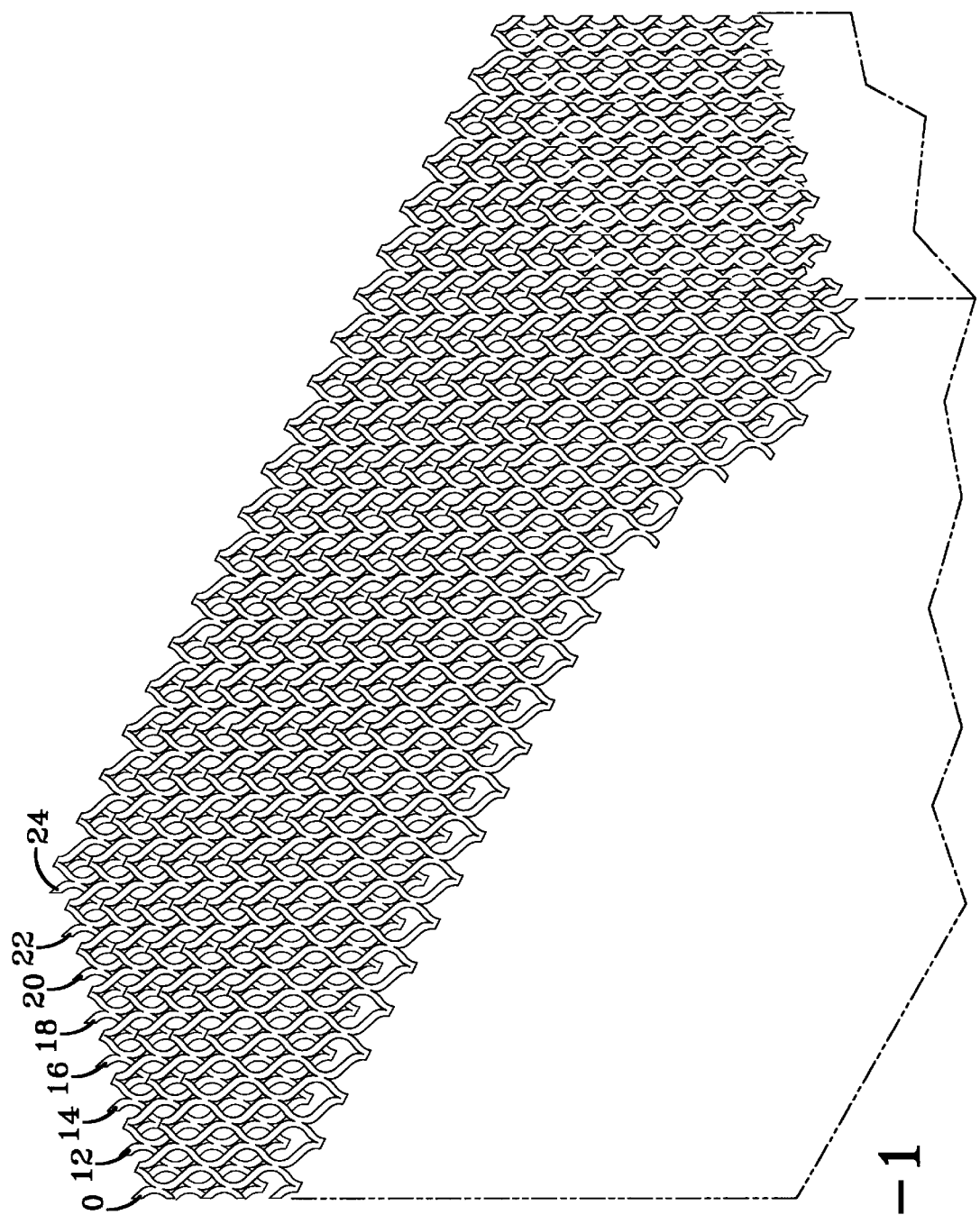
FIG. 1 is a view in perspective illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

BRIEF DESCRIPTION OF THE PREFERRED EMBODIMENT

FIG. 1 shows a humidifier pad for preferably a wicking up type humidifier embodying the present invention. The pad is made of preferably a plurality of slit and expanded paper sheets 10–24. The sheets or layers of paper, which can be in any suitable operative number, are stacked and preferably bonded together to form a composite humidifier pad, which has first and second opposite outer surfaces. Other conventional means for forming a composite pad from the stacked layers may also be employed without departing from the present invention. Each sheet has opposite major surfaces which contact, and are adhered to, the major surface of the adjacent sheets on opposite sides. The sheets are bonded together in a well-known conventional manner, preferably with an adhesive which adheres only to the points of contact between the sheets.

The preferred pad consists of multiple layers of two different types of paper. A first type is wicking paper, which has a relatively high capillary rise. Capillary rise is a measure of the rate of absorption of water and is referred to as Klemm in the paper industry. Typically it measures the rate of travel or rise of water in paper having a portion of the sheet disposed in contact with a liquid, such as water for example. A preferred wicking paper is commercially available from Ahlstron and is currently sold under the grade number H1278. This paper has a basis weight of 115 to 130 grams per square meter, a wet tensile strength of 2 to 8 lbs per inch, a Klemm value of $45/16$ inch to $79/16$ inch per minute and a thickness of 18.5 to 24.5 mils. The Klemm value must be sufficient to adequately function in a wicking up type humidifier. A small amount of a wet strength resin is included to provide wet strength without sacrificing the necessary high rate of absorption. Those with a Klemm value of $55/16$ inch or greater are preferred.

The second type of paper employed in the pad includes a substantially nonwicking type paper, which has a relatively low capillary rise or Klemm value. For the preferred embodiment, a white Kraft paper is used as the substantially nonwicking paper, preferably having a basis weight of about 0.0167 lbs per square foot, a wet tensile strength of about 29 lbs per inch, a Klemm of $1/16$ inch per minute and a thickness of about 4.7 mils. However, any paper with a Klemm value between about $1/16$ inch to $16/16$ inch per minute will suffice as a substantially nonwicking paper for purposes of the present invention. The nonwicking paper sheet or layer need only be sufficiently absorbent to permit the sheet to be readily wetted through contact with the wetted wicking paper sheet.

The preferred ratio of wicking paper layers to nonwicking paper layers in a particular humidifier design pad is dependent upon the designed output capacity of the humidifier unit using the pad. A pad which produces a predetermined range of output capacity for a given system design is satisfactory if it has the width, height and thickness required for it to fit in the pad holder of the humidifier for which it is designed. The number of sheets of wicking paper versus the nonwicking paper is the lowest ratio necessary to reliably produce the practical equivalent of the designed output capacity.

The inventors have not determined an ideal ratio of wicking layers to nonwicking layers. However, several experiments were performed on humidifier pads having different ratios of the two types of paper sheets to attempt to quantify the effect of replacing wicking paper layers with nonwicking paper layers. The experiments measured the amount of water that evaporated from the same wicking type humidifier during a predetermined period using pads having different ratios of the two types of paper described above. The results are shown in the table of FIG. 2, which is shown graphically in FIG. 3.

In the experiments, a conventional humidifier pad with 24 layers of all-wicking paper was tested to determine the amount of water that evaporated during a 24 hour period. Next, a pad with 24 layers of nonwicking paper as described above was tested. Then, several different pads with different ratios of sheets of wicking paper to sheets of nonwicking paper were tested.

All of the experiments were performed using the same conventional humidifier unit under the same airflow (fan) speed. The relative humidity and temperature in the room varied slightly from test to test. For example, the relative humidity varied from below 20% to 39%, with about $2/3$ of all experiments performed at a relative humidity between 25% and 34%. The temperature varied between about 65° F. and 78° F., with about $2/3$ of all experiments performed at a temperature between 67° F. and 73° F.

The experimental results show that the amount of water output in 24 hours surprisingly decreased only very slightly when 4 and 7 wicking paper layers were replaced with nonwicking paper layers (3% and 5% decrease respectively in output for a pad having nonwicking layers representing 16% and 29% of the total number of paper layers, respectively). A decrease in output rate of less than 18% was noted when half (50%) of the layers of wicking paper were replaced with the nonwicking paper. The output rate decreased substantially upon replacing significantly more than half of the wicking paper layers with nonwicking paper.

One of the preferred embodiments deemed qualified for commercial applications produced the remarkable output results of 2.83 gallons of water per 24 hour period compared to 2.99 gallons for a conventional pad having 24 layers of wicking paper. In this embodiment, 7 layers or sheets of wicking paper were replaced with 7 layers of nonwicking paper disposed between adjacent wicking paper layers in a 24 layer pad. The results reflect a difference of only 0.16 gallons per 24 hour period between the conventional pad having all wicking paper layers and this embodiment of the invention. This difference in output capacity is essentially negligible, yet the savings in cost by replacing seven wicking paper layers with the lower cost nonwicking layers is highly significant when such a high volume item is involved in a very competitive, price-sensitive industry.

Because of the substantially nonwicking characteristics of the nonwicking paper and the fact that the only supply of water to the exposed areas of the pad is obtained via high rates of capillary rise, one would expect the output rate of a pad to decrease essentially in proportion to a decrease in the ratio of wicking layers to nonwicking layers comprising the pad. Accordingly, the output capacity rate for a pad with 50% of the wicking paper layers replaced by nonwicking paper would be expected to be about or at least approach 50% of the output rate for the pad comprising all wicking paper layers. However, the experiments provide surprising and unexpected results in this regard. Instead of the expected generally proportional/linear drop in the output capacity rate which would be shown by the straight line 30, the drop is actually more exponential as shown by the curved line 40 on the graph of FIG. 3.

The relative humidity and temperature does not appear to have affected the test results to cause the exponential drop in output capacity. In fact, for three of the pad types tested, the 20w/4n, the 12w/12n and the 6w/18n, the test conditions were similar: relative humidity between about 20% and about 35%, and temperatures in the upper 60's to mid 70's. In fact, the more extreme test conditions were for the all-nonwicking paper pad (more evaporation would be expected, making the test results even more surprising), and the test in which no pad was used. Therefore, the test conditions were reasonably similar and unlikely to cause the resulting unexpected exponential curve in output capacity between the various combinations tested.

The phenomena which caused the unexpected results shown in the graph of FIG. 3 are not fully understood, but the following hypothesis is put forward by the inventors to explain the cause of these unexpected results.

A nonwicking paper, such as the Kraft paper described herein, has a relatively low capillary rise. Because of this, water in the reservoir of a wick-up humidifier rises only a very short distance above the level of the reservoir in the nonwicking paper by capillary action. Therefore, the lower portion of the nonwicking paper layer disposed in the reservoir does not supply water to itself in the critical area of the pad above the reservoir which is exposed to the flow of air. However, because the surface of the nonwicking paper contacts the surface of adjacent wicking paper at many surface points, water can be transferred to the surface of the nonwicking paper layer from the surface contact points with the wetted wicking paper. Therefore, water transferred to the nonwicking paper layer by contact with a layer of wetted wicking paper only needs to be absorbed by the nonwicking paper sufficiently to readily wet the surface thereof.

Although the nonwicking paper is not nearly as absorbent as the wicking paper, it is absorbent enough to be readily wettable on and/or near its surface by contact with the wetted wicking paper. Therefore, this wetted surface of the nonwicking paper provides essentially the same surface area of a wicking paper layer exposed to the flow of air. Therefore, as long as the wicking paper remains sufficiently wetted via its high capillary rise characteristic, it functions to supply water from the reservoir for evaporation from its own surface as well as to continuously wet an adjacent surface of a layer of nonwicking paper.

Depending upon the design considerations, including the volume of air forced through the pad, and rate of evaporation from the layers, it is theorized that any excess capacity of the wicking paper to maintain an adequate degree of wettness via the high Klemm value is available to be transferred to the surface of the nonwicking paper. Therefore, the nonwicking paper functions to draw off some of this excess capacity from the wicking paper by the transfer of water to its surface area from which an additional volume of water is readily exposed to evaporation. That is, water absorbed by the wicking layers is removed therefrom via two phenomena. One phenomenon is evaporation and the other is the physical transfer by contact with the nonwicking layer.

Therefore, if the wicking paper has high enough capillary rise to replace the water evaporated from the wicking paper and the nonwicking paper layer, an adequate water supply is available for both the wicking and nonwicking paper to provide evaporation from the combined surface area of both types of paper. This results in almost as high an output rate with the appropriate mixture of wicking and nonwicking paper as obtained using layers of wicking paper only.

In essence, when a nonwicking paper layer is interposed between two wicking layers, although the nonwicking layer cannot wick any significant amount of water from the reservoir to the upper exposed portion of the sheet, the exposed surface of the nonwicking paper is readily wetted by contact with the wicking paper.

In the past, a high capillary rise material was considered essential in all functional layers of the pad to obtain the desired output capacity. However, surface area is also a limiting factor to output capacity. The present inventors have discovered that a mixture of wicking and nonwicking paper sheets is almost as effective as all-wicking paper layers because the surface area provided by the nonwicking paper combined with the water transferred by contact with adjacent wicking paper layers only minimally reduces output capacity for up to about a 20 or 30 percent replacement ratio. It appears that in conventional pads using all-wicking paper layers, the wicking paper layers provide the necessary surface area needed for sufficient output capacity, but include an unexpected redundant capacity to supply replacement water to the portion of the wicking paper layer exposed to the flow of air. The nonwicking layers disposed in accordance with the present invention capitalize on this excess and lead to essentially the same desired result at significant cost savings.

In general, therefore, the present invention includes a selected number of nonwicking paper layers interposed between wicking paper layers, with the opposite major surfaces of the nonwicking paper in intimate contact with the adjacent wicking paper layers. Furthermore, it is preferred that all nonwicking sheets are interposed between wicking paper sheets so that a sufficient amount of water is transferred to both major surfaces of each nonwicking paper layer. The hypothesis proposed by the inventors to explain the unexpected experimental results fuels this preference. The more rapid drop in evaporation rate when more than half of the wicking layers are replaced by nonwicking layers is hypothesized to occur because each nonwicking paper layer no longer has wicking paper in contact with both major surfaces of the nonwicking paper layer. For each nonwicking paper layer not in contact with a wicking paper layer on both sides to supply replacement water, the output capacity is significantly decreased over those pads having the preferred configuration.

While certain preferred embodiments of the present invention have been disclosed in detail, it is to be understood that various modifications may be adopted without departing from the spirit of the invention or scope of the following claims.

What is claimed is:

1. A humidifier pad comprising:
    (a) a plurality of superposed sheets of slit and expanded wicking paper joined together, each sheet having opposing major surfaces; and
    (b) a first sheet of slit and expanded substantially nonwicking paper having opposing major surfaces, said first sheet being interposed in parallel relationship between, and bonded to, facing adjacent major surfaces of a first pair of said wicking paper sheets.

2. A pad in accordance with claim 1, further comprising a plurality of sheets of substantially nonwicking paper, wherein each major surface of each of said sheets of substantially nonwicking paper is disposed in contact with a major surface of one of said wicking paper sheets.

3. A pad in accordance with claim 2, wherein said plurality of sheets of nonwicking paper comprise up to about one-third of the total number of wicking and nonwicking sheets in said pad.

4. A pad in accordance with claim 2, wherein said plurality of sheets of nonwicking paper comprise between about one-sixth to one-third the total number of wicking and nonwicking sheets in said pad.

* * * * *